US008725380B2

(12) United States Patent
Braunberger et al.

(10) Patent No.: US 8,725,380 B2
(45) Date of Patent: May 13, 2014

(54) ABSOLUTE ACCELERATION SENSOR FOR USE WITHIN MOVING VEHICLES

(71) Applicant: Vision Works IP Corporation, Sequim, WA (US)

(72) Inventors: Alfred S. Braunberger, Thousand Oaks, CA (US); Beau M. Braunberger, Upland, CA (US)

(73) Assignee: Vision Works IP Corporation, Sequim, WA (US)

( * ) Notice: Subject to any disclaimer, the term of this patent is extended or adjusted under 35 U.S.C. 154(b) by 0 days.

(21) Appl. No.: 13/897,209

(22) Filed: May 17, 2013

(65) Prior Publication Data

US 2013/0249685 A1    Sep. 26, 2013

Related U.S. Application Data

(60) Continuation of application No. 11/821,352, filed on Jun. 21, 2007, now Pat. No. 8,532,896, which is a division of application No. 11/243,364, filed on Oct. 3, 2005, now Pat. No. 7,239,953.

(60) Provisional application No. 60/616,400, filed on Oct. 5, 2004.

(51) Int. Cl.
  *G06F 7/70*  (2006.01)
  *G06F 19/00* (2011.01)
  *G06G 7/00*  (2006.01)
  *G06G 7/76*  (2006.01)

(52) U.S. Cl.
  USPC ....... 701/70; 701/1; 701/45; 701/48; 340/467

(58) Field of Classification Search
  USPC ............ 340/467; 701/1, 2, 22, 23–36, 45, 48, 701/70
  See application file for complete search history.

(56) References Cited

U.S. PATENT DOCUMENTS

| | | |
|---|---|---|
| 3,725,921 A | 4/1973 | Weidman et al. |
| 6,233,515 B1 | 5/2001 | Engelman et al. |
| 6,298,931 B1 | 10/2001 | Easton |
| 6,765,495 B1 | 7/2004 | Dunning et al. |
| 7,104,364 B2 | 9/2006 | Godlewsky et al. |
| 8,315,769 B2 | 11/2012 | Braunberger et al. |
| 8,437,935 B2 | 5/2013 | Braunberger et al. |
| 2004/0139034 A1 | 7/2004 | Farmer |
| 2005/0156727 A1 | 7/2005 | Golder |
| 2006/0074540 A1 | 4/2006 | Braunberger et al. |
| 2007/0233337 A1 | 10/2007 | Plishner |
| 2010/0217507 A1 | 8/2010 | Braunberger et al. |

*Primary Examiner* — Bhavesh V Amin

(57) ABSTRACT

A method of and system for detecting absolute acceleration along various axes relative to a desired movement vector while moving relative to a gravity source includes steps of determining a vertical acceleration, perpendicular to the desired movement vector and substantially anti-parallel to a gravitational acceleration due to the gravity source; determining a longitudinal acceleration, parallel to the desired movement vector and to output at vertical acceleration signal and a longitudinal acceleration signal; determining an inclination of the desired movement vector relative to the gravitational acceleration; and processing the vertical acceleration signal, the longitudinal acceleration signal, and the inclination signal to produce an absolute vertical acceleration signal and an absolute longitudinal acceleration signal.

47 Claims, 9 Drawing Sheets

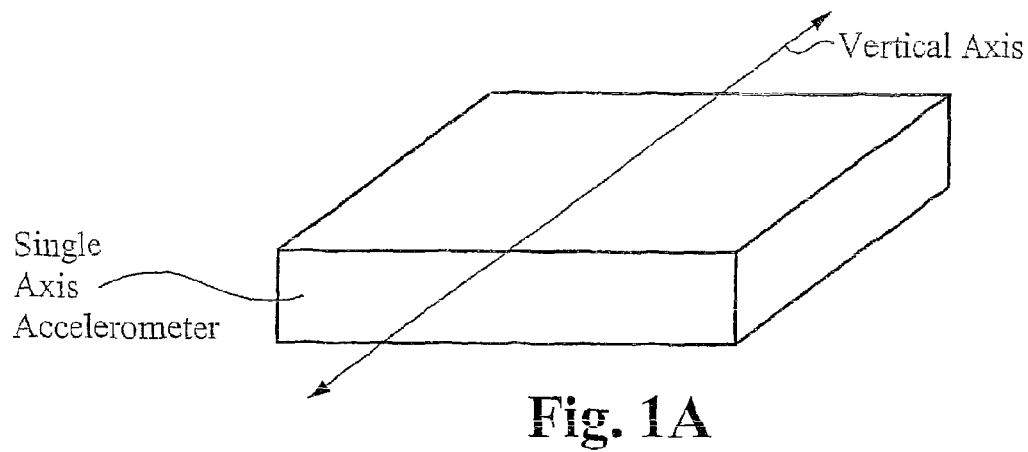
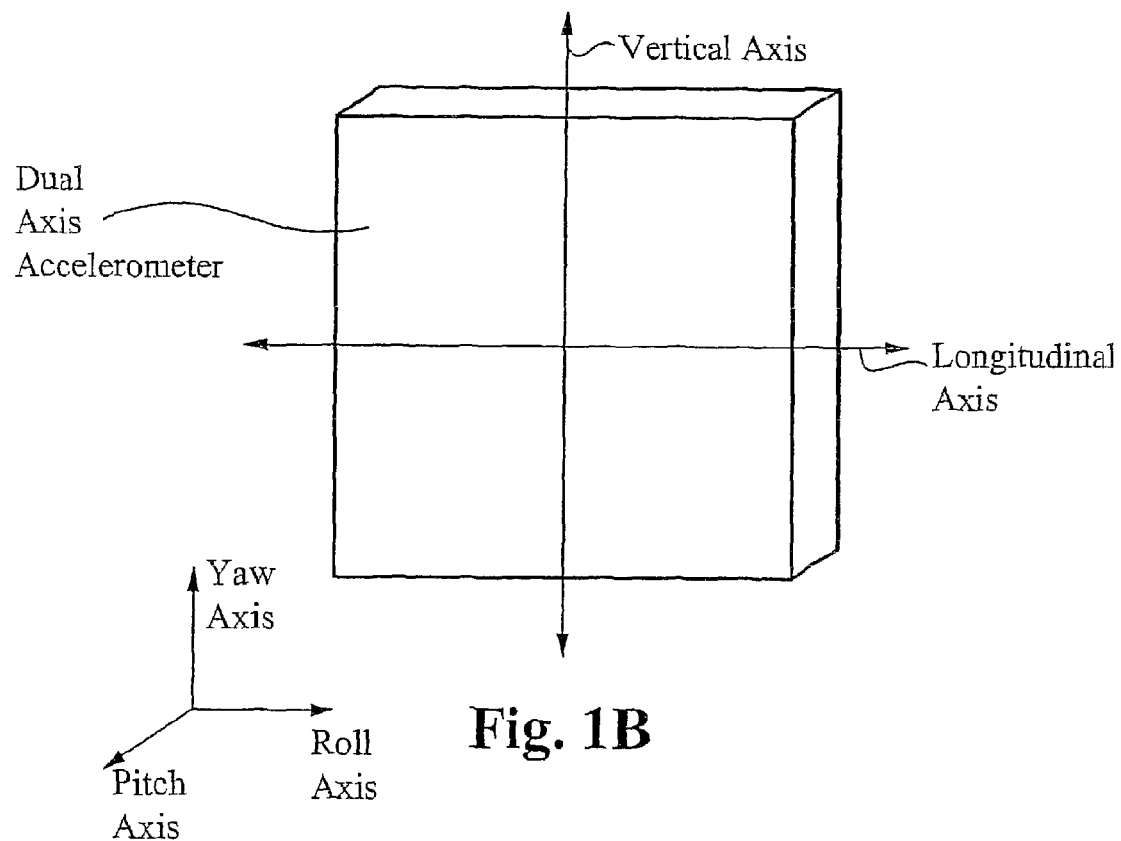

ABSOLUTE ACCELERATION SENSOR FOR USE WITHIN MOVING VEHICLES

RELATED APPLICATION

This application is a continuation of co-pending U.S. patent application Ser. No. 11/821,352, filed on Jun. 21, 2007, and entitled "ABSOLUTE ACCELERATION SENSOR FOR USE WITHIN MOVING VEHICLES" which is a divisional of co-pending U.S. patent application Ser. No. 11/243,364, filed on Oct. 3, 2005, and entitled "ABSOLUTE ACCELERATION SENSOR FOR USE WITHIN MOVING VEHICLES" which claims priority under 35 U.S.C. 119(e) of the U.S. provisional patent application, Application No. 60/616,400, filed on Oct. 5, 2004, and entitled "REAR-END COLLISION AVOIDANCE SYSTEM." The U.S. patent application Ser. No. 11/821,352, filed on Jun. 21, 2007, and entitled "ABSOLUTE ACCELERATION SENSOR FOR USE WITHIN MOVING VEHICLES," the U.S. patent application Ser. No. 11/243,364, filed on Oct. 3, 2005, and entitled "ABSOLUTE ACCELERATION SENSOR FOR USE WITHIN MOVING VEHICLES" and the provisional patent application, Application No. 60/616,400, filed on Oct. 5, 2004, and entitled "REAR-END COLLISION AVOIDANCE SYSTEM" are all also hereby incorporated by reference in their entireties.

FIELD OF THE INVENTION

The present invention relates generally to methods and devices for detecting absolute levels of longitudinal, lateral and vertical acceleration within moving vehicles, and to a variety of systems and methods for generating responses to changes in these absolute levels.

BACKGROUND OF THE INVENTION

Accelerometers find a wide variety of applications within modern motor vehicles. The most common of these are impact and collision sensors used to deploy front and side impact air bags in modern passenger cars and trucks.

In applications that depend on sudden and drastic deceleration, the presence of gravity is of little consequence and will not affect the implementation of the accelerometer. However, increasingly feedback systems within motor vehicles have attempted to make use of accelerometer data during much lower and subtler levels of acceleration.

One example is anti-collision warning systems. Though all street legal motor vehicles have brake lamps configured to signal other drivers of braking, these signals do not warn following drivers of imminent braking. At least one system has proposed activating a vehicle's brake lamp system in response to a deceleration signal from a sensitive accelerometer, and independent of actuation of the brake pedal. The system described in U.S. Pat. No. 6,411,204 to Bloomfield et al., entitled "DECELERATION BASED ANTI-COLLISION SAFETY LIGHT CONTROL FOR VEHICLE," includes a plurality of deceleration thresholds each with an associated modulation of the brake lamps.

However, the system fails to precisely account for gravitational forces, limiting its effectiveness to deceleration regimes where gravity's effect is minimal and reducing its effectiveness as an early warning system. Accelerometers, known as tilt sensors in the gaming and robotics industries, are extremely sensitive to any gravitational force to which they are not perpendicular. This sensitivity complicates any system that attempts to detect low levels of acceleration by using accelerometers within moving vehicles, since the system must account for the wide variety of orientations of the accelerometer relative to the earth's gravity introduced as the vehicle travels uphill, downhill, through cambered or off-camber curves, and on cambered grades. For instance, an accelerometer in a vehicle stopped on a 45-degree downhill slope would sense deceleration of a magnitude equal to 0.71 times the acceleration due to gravity. To avoid gravitational acceleration artifacts, the system of Bloomfield only produces output if the deceleration signal rises above a predetermined threshold set above the level of artifacts introduced during typical driving conditions.

However, the reliance of this device on a threshold deceleration reduces its effectiveness as an early warning system. Even a short delay between the time when the subject vehicle begins to slow down and the time when a following vehicle begins to slow can result in a rapid closure of the gap, or following distance, between the vehicles, and a potential collision. Consequently, the shorter the following distance between vehicles, the smaller the margin of error will be for drivers of following vehicles to avoid rear-end collisions. Disengaging the accelerator, or coasting, is often the first response of the driver of a subject vehicle to observing a non-urgent traffic event in the roadway ahead, and usually results in a slight deceleration. By failing to warn other drivers of the possible imminence of braking of a subject vehicle, the proposed device loses valuable time. To avoid this problem, the threshold must be set lower, which could result in gravitational acceleration artifacts affecting the system's output. For example, an overly low threshold could prevent the device from signaling deceleration on an uphill grade since the accelerometer would sense a component of the earth's gravity as acceleration. Similarly, a low threshold could cause the device to continuously flash during a descent, while gravity appears as deceleration.

The loss of time incurred by a threshold-based system might be tolerable in some other application; but in collision prevention, even an instant saved can prevent a collision. A Special Investigative Report issued in January of 2001 by the National Transportation Safety Board (NTSB) illustrates the scale of the problem. The report notes that in 1999 "1.848 Million rear-end collisions on US roads kill[ed] thousands and injur[ed] approximately [one] Million people." The report concluded that even a slightly earlier warning could prevent many rear-end collisions.

Regardless of the individual circumstances, the drivers in these accidents were unable to detect slowed or stopped traffic and to stop their vehicles in time to prevent a rear-end collision. If passenger car drivers have a 0.5-second additional warning time, about 60 percent of rear-end collisions can be prevented. An extra second of warning time can prevent about 90 percent of rear-end collisions. [NTSB Special Investigative Report SIR—01/01, *Vehicle-and Infrastructure-based Technology for the Prevention of Rear-end Collisions*]

SUMMARY OF THE INVENTION

In this application "acceleration" refers to either or both positive acceleration and negative acceleration (sometimes called "deceleration"), while "deceleration" refers to only negative acceleration.

The present invention relates to devices that overcome the limitations of the prior art by integrating signals from two separate sensors that have completely different references to construct a signal representing only actual acceleration, including deceleration, of the vehicle. The preferred embodiments use signals from both an accelerometer, which sometimes detects gravitational acceleration in addition to actual vehicle acceleration, and a gyroscope configured to sense deviations from the plane perpendicular to the earth's gravity. By modifying the signals from the accelerometer based on those from the gyroscope, the preferred embodiments monitor the absolute acceleration, including absolute deceleration, of the vehicle relative to the road.

The preferred embodiment of the present invention combines an integrated accelerometer and an integrated gyroscope, such as a rate gyroscope, in a single system that electronically integrates their signals to provide for highly accurate detection of absolute acceleration with no arbitrary thresholds required. Elsewhere, this portion of the present invention is referred to as an "accelerometer-g-sensor."

In one aspect, the present invention relates to a method of detecting absolute acceleration along various axes relative to a movement vector while moving relative to a gravity source, comprising: determining a vertical acceleration, perpendicular to the movement vector and substantially anti-parallel to a gravitational acceleration due to the gravity source; determining a longitudinal acceleration, parallel to the movement vector and to output a vertical acceleration signal and a longitudinal acceleration signal; determining an inclination of the movement vector relative to the gravitational acceleration; and processing the vertical acceleration signal, the longitudinal acceleration signal, and the inclination signal to produce an absolute vertical acceleration signal and an absolute longitudinal acceleration signal.

In another aspect, the invention relates to a system for detecting absolute acceleration along various axes relative to a movement vector while moving relative to a gravity source, comprising: a two-axis accelerometer configured to sense both a vertical acceleration, perpendicular to the movement vector and substantially anti-parallel to a gravitational acceleration due to the gravity source, and a longitudinal acceleration, parallel to the movement vector and to output a vertical acceleration signal and a longitudinal acceleration signal; a gyroscope configured to sense an inclination of the movement vector relative to the gravitational acceleration and to output an inclination signal; and a logic circuit configured to process the vertical acceleration signal, the longitudinal acceleration signal, and the inclination signal to produce an absolute vertical acceleration signal and an absolute longitudinal acceleration signal.

Rear End Collision

The present invention provides systems and methods for warning drivers of other vehicles of any possibility that a subject vehicle will brake and/or that the following vehicle may need to decelerate. This warning occurs earlier than warnings provided by traditional rear brake warning systems. The preferred embodiment of the present invention takes advantage of the existing conditioning of modern drivers to respond quickly to rear brake warning lamps by using these systems to convey new deceleration warnings. In one aspect, the present invention relates to a communication system for a vehicle. The communication system includes an absolute deceleration detector including an accelerometer, a gyroscope, and a control logic and configured to detect an absolute deceleration status of the vehicle, a braking system engagement detector to detect a braking status of the vehicle, an alerting device capable of signaling other drivers of a deceleration condition of the vehicle, and a control device coupled to the accelerometer-gyroscopic sensor, the throttle engagement detector, the braking system engagement detector, and the alerting device. In this configuration, the accelerometer-gyroscopic sensor sends signals to the control device and the control device operates the alerting device in a manner dependent on the deceleration status, the braking status, and the throttle status of the vehicle.

In another aspect, the present invention describes a method of alerting drivers in proximity to a vehicle of deceleration and braking of the vehicle. The method includes steps of sensing an apparent rate of deceleration of the vehicle, sensing an inclination of the vehicle relative to a gravitational acceleration, correcting the apparent rate of deceleration to account for an effect of gravitational acceleration to determine an absolute rate of deceleration of the vehicle, detecting a braking status of the vehicle, and emitting a signal to indicate that the vehicle is decelerating. In this aspect, the signal varies depending on the rate of deceleration, the braking status, and the throttle status of the vehicle.

In a third aspect, the present invention relates to a method of forming a communication system for a vehicle. The method comprises a step of adding a deceleration warning circuit to a brake lamp system of the vehicle coupled with the deceleration detection circuit. In this method, the deceleration detection circuit comprises a deceleration detector, wherein the deceleration detector detects any deceleration of the vehicle, a gyroscope, wherein the gyroscope detects an inclination of the vehicle relative to a gravitational acceleration, a logic circuit configured to determine an absolute deceleration from the deceleration of the vehicle and the inclination of the vehicle, a braking system engagement detector, wherein the braking system engagement detector any engagement of a braking system of the vehicle, wherein the throttle engagement detector detects any disengagement of a throttle of the vehicle, and a control device coupled to the accelerometer-gyroscopic sensor and the braking system engagement detector, wherein the accelerometer-gyroscopic sensor, the braking system engagement detector, and the throttle engagement detector send signals to the control device, and wherein the control device activates brake lamps of the vehicle if the throttle is disengaged.

BRIEF DESCRIPTION OF THE DRAWINGS

FIG. 1A illustrates a single axis accelerometer positioned for measuring lateral acceleration, and included in an accelerometer-gyroscopic sensor in accordance with an embodiment of the present invention.

FIG. 1B illustrates a dual axis accelerometer positioned for measuring vertical and longitudinal acceleration, and included in an accelerometer-gyroscopic sensor in accordance with an embodiment of the present invention.

DETAILED DESCRIPTION OF THE INVENTION

The present invention includes systems and methods for detecting absolute rates of acceleration of bodies moving relative to a gravitational acceleration. The preferred embodiment uses signals from both an accelerometer, which sometimes detects gravitational acceleration in addition to actual vehicle acceleration, and a gyroscope, which can sense deviations from the plane perpendicular to earth's gravity. By modifying the signals from the accelerometer based on those from the gyroscope, the preferred embodiment monitors the absolute acceleration or deceleration of a vehicle relative to the road, or some other body relative to any object that is fixed relative to some gravity source that affects the body.

Figure 2A:
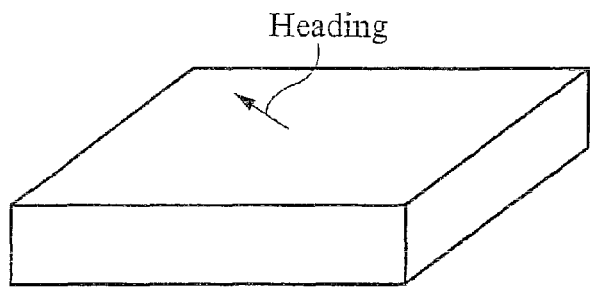
FIG. 2A illustrates a gyroscope positioned for measuring a heading, and included in an accelerometer-gyroscopic sensor in accordance with an embodiment of the present invention.
Figure 2B:
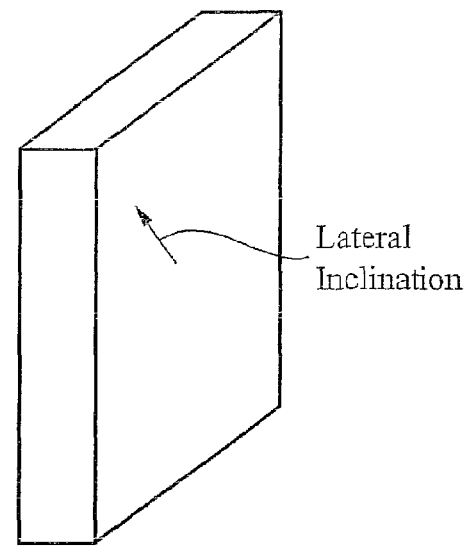
FIG. 2B illustrates a gyroscope positioned for measuring a lateral inclination, and included in an accelerometer-gyroscopic sensor in accordance with an embodiment of the present invention.
Figure 2C:
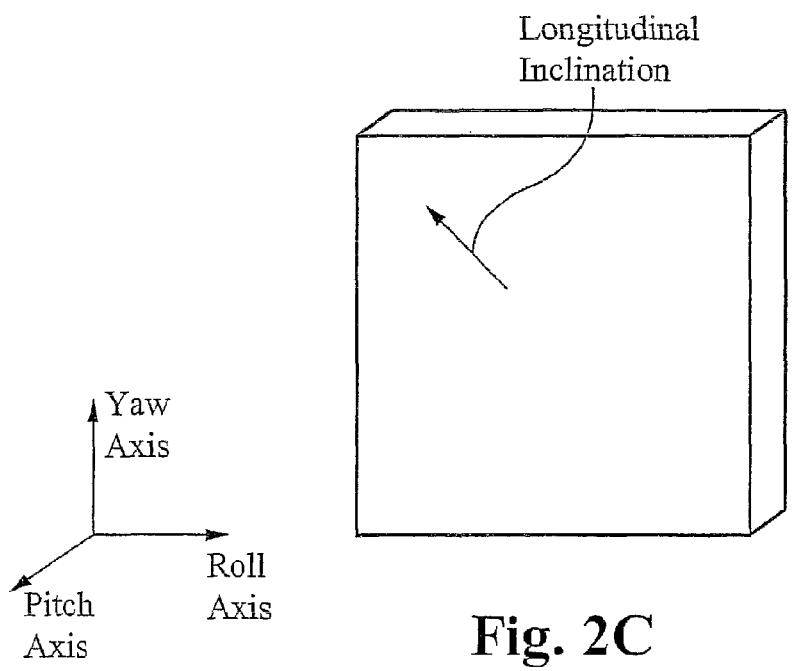
FIG. 2C illustrates a longitudinal inclination, and included in an accelerometer-gyroscopic sensor in accordance with an embodiment of the present invention.

As shown in FIGS. 1B and 2C, the preferred embodiment of the present invention includes a dual axis accelerometer and an electronic gyroscope positioned upon a moving body (not shown) having a pitch axis and a yaw axis that form a pitch-yaw plane as illustrated, which attempts to move along a movement vector orthogonal to the pitch-yaw plane. A first axis, termed the longitudinal axis, of the dual axis accelerometer is placed orthogonal to the plane of the pitch and yaw axes to sense acceleration along the movement vector. A second axis, termed the vertical axis, of the accelerometer is placed parallel with the yaw axis (and thus perpendicular to the movement vector) to sense acceleration along the yaw axis. Thus the two axes of the accelerometer form a longitudinal-vertical plane orthogonal to the pitch-yaw plane.

The gyroscope in FIG. 2C is mounted parallel to the longitudinal-vertical plane of the accelerometer and thus is also along a plane perpendicular to the pitch-yaw plane of the moving body. This configuration allows it to sense an inclination of the movement vector of the moving body relative to the gravitational acceleration acting on the body.

In some embodiments of the present invention, additional gyroscopes and accelerometers are mounted on the moving body at other orientations. Output from these additional sensors is useful for anti-roll suspension adjustment, among other things. The orientations shown in FIGS. 1A and 2B allow for detection of lateral acceleration and inclination. In FIG. 1A, a single axis accelerometer configured with a first axis, termed the lateral axis, parallel to the pitch axis senses lateral acceleration of the body, e.g. acceleration in a plane orthogonal to the longitudinal-vertical plane.

When the body does undergo a lateral acceleration, its actual movement is no longer along the desired movement vector. Thus, during lateral acceleration, another gyroscope must be included to sense the inclination of the component of the actual movement vector that lies along the lateral axis. FIG. 2B depicts a gyroscope configured parallel to the pitch-yaw plane and thus configured to detect an inclination of the component of movement that lies along the lateral axis, termed the lateral inclination of the body.

In some embodiments, the system also includes another gyroscope that is configured parallel to the lateral-longitudinal plane (in which all desirable movement vectors will lie), to detect a heading of the body. This additional gyroscope is required for those embodiments that supply supplemental data to navigation systems.

Preferably, the embodiments of the present invention include logic circuits configured to receive signals of acceleration along the lateral, longitudinal, and vertical axes, as well as of the lateral and longitudinal inclinations and the heading, and to process these signals to produce a variety of output signals indicating characteristics of the moving body's movement. These preferably include: absolute longitudinal acceleration (both positive and negative), absolute vertical acceleration (both positive and negative), absolute lateral acceleration (both positive and negative), heading, and actual speed.

Though accelerometers are inherently stable, and especially so when internally temperature compensated, gyroscopes, both mechanical and electronic, can suffer from instability and drift. Because of these drift characteristics, gyroscopes typically require periodic auto-zeroing or re-referencing to provide reliable output.

In some embodiments of the present invention, a method of detecting an absolute deceleration includes steps of re-referencing. This task is preferably accomplished using signals from the accelerometers, but in other embodiments use a Hall effect, electronic or other type of compass.

Re-referencing preferably takes place periodically; for systems using Hall effect or some other independent compass, the systems simply re-reference at specified heading or timing intervals. However, systems that use accelerometer data for re-referencing are preferably more careful. When stationary, any signal from the accelerometer is essentially representative of the earth's gravity, this signal can provide an initial reference for any gyroscopes included in the present invention, which preferably takes place prior to movement of the body.

Once the body has begun moving, without periodic re-referencing, the gyroscope output can become unreliable. The present invention teaches several methods of re-referencing during travel. Some of these are only applicable to travel that includes periodic stops. For example, the vertical or lateral axis accelerometers can be used to detect whether the body is stopped. When it is stopped, the signal from the longitudinal axis of the accelerometer can be used to re-reference the gyroscope. Further, at any point during travel when no acceleration has been detected for a predetermined period of time the gyroscope can be re-referenced. In this way repeated referencing can occur even during extended travel without any stops.

The present invention is preferably implemented in a vehicle, and the following embodiments of the present invention are described relative to a vehicle. However, the methods and systems taught by the present invention can be implemented in a wide variety of moving bodies other than vehicles. Further, for convenience, the devices described above with reference to FIGS. 1A, 1B, 2A, 2B, and 2C are termed an "accelerometer-gyroscopic sensor" when referenced elsewhere.

Example 1

Rear End Collision Avoidance

Figure 3A:
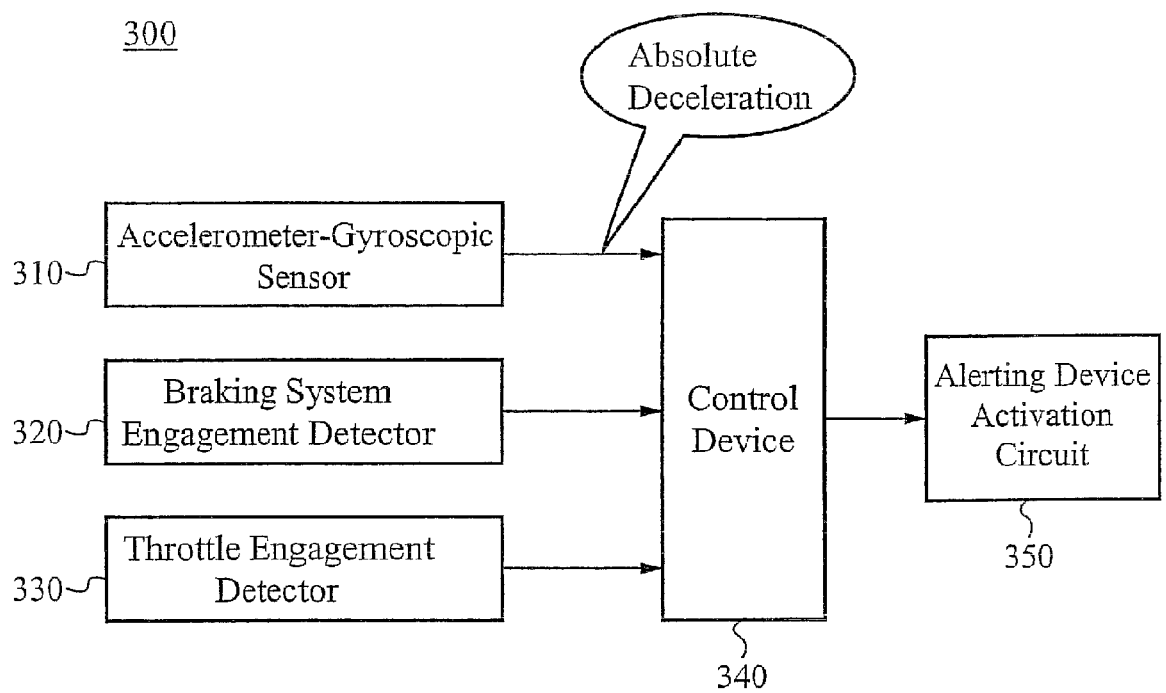
FIG. 3A is a schematic view illustrating the components of the rear-end collision avoidance system, warning drivers of a subject vehicle's deceleration, in accordance with an embodiment of the present invention.

FIG. 3A is a schematic view illustrating the components of the rear-end collision avoidance system 300, warning drivers of a subject vehicle's deceleration, in accordance with one embodiment of the present invention. The rear-end collision avoidance system 300 comprises an accelerometer-gyroscopic sensor 310, a braking system engagement detector 320, a throttle engagement detector 330, and a control device 340. The accelerometer-gyroscopic sensor 310 is coupled to the control device 340, detects an absolute longitudinal deceleration of the vehicle, and sends a signal to the control device 340. The braking system engagement detector 320 is also coupled to the control device 340, detects any engagement of the braking system of the vehicle, and sends a signal to the control device 340. The throttle engagement detector 330 is also coupled to the control device 340 and detects engagement of the throttle. In alternative embodiments, the present invention also includes additional input devices, such as a clutch engagement detector configured to relay a clutch status to the control device 340. Next, the control device 340 processes the input signals it receives from the accelerometer-gyroscopic sensor 310, the braking system engagement detector 320, and the throttle engagement detector 330 and decides whether to activate an alerting device of the vehicle. In some embodiment the control device 340 only activates an alerting device if the vehicle is throttled down but not braking. In some embodiments, the control device 340 activates the alerting device only if the absolute longitudinal deceleration is non-zero. In one embodiment, the communication system further comprises an alerting device activation circuit 350, wherein the control device 340 is coupled to and sends signals to the alerting device activation circuit 350, which activates an alerting device based on a signal from the control device 340.

The embodiments of the present invention include input devices. Those mentioned above include braking system engagement detectors, throttle engagement detectors, and the accelerometer-gyroscopic sensor. In alternative embodiments, the present invention also includes additional input devices, such as a clutch engagement detector configured to relay a clutch status to the control device.

The embodiments of the present invention include alerting devices. In the present invention, an alerting device preferably comprises lamps on the vehicle that are capable of flashing and emitting visible light. In one aspect, the lamps of the alerting device flash only at a constant rate, while in another aspect the lamps flash at a variable rate, and further wherein the control device is configured to flash the lamps at a rate correlated to a rate of deceleration. The lamps are preferably one of the following: conventional signaling lamps and conventional brake lamps. However, in another embodiment, the alerting device is a radio frequency (RF) transmitter capable of directing RF signals from the rear of the vehicle to a following vehicle. In other embodiments, the alerting device uses other types of signals.

When used in this patent, the terms "conventional signaling lamps" and "conventional brake lamps" refer to signaling or brake lamps included on motor vehicles during their original manufacture. The present invention also contemplates signaling by using after-market devices that are attached to a vehicle in addition to conventional signaling and brake lamps.

A communication system can be embodied as an after-market add-on product or as an original vehicle system. These embodiments include different types of controllers. In an add-on system, a control device preferably does not interfere with the existing brake lamp system controller. The control device communicates with the brake lamps in a substantially separate manner from the existing brake lamp control system. Control devices used in the present invention could include relays, switches or micro controllers. In one aspect, an after-market system can continuously power the alerting device activation circuit without need of an intermediate control device.

However, in an original equipment system, a communication system in accordance with the present invention preferably includes a control device that further comprises a control system for the conventional brake lamp system, whereby the communication system is an integrated control and circuitry system for all brake lamps. In this aspect, a single control system accomplishes the tasks of conventional brake signaling and the signaling described in the present invention.

During operation, the communications system of the present invention uses information from the various input devices to determine a manner in which to operate an alerting device. In one aspect, the communications system continuously modulates the alerting device based on the accelerometer-gyroscopic sensor's input so long as the throttle is disengaged, regardless of braking system status. In another aspect, once the braking system is engaged, the communications system activates the alerting device continuously until disengagement of the braking system, whereupon the communications system once again considers throttle and the accelerometer-gyroscopic sensor's input in choosing a manner in which to operate the alerting device. In a third aspect, where a conventional braking system exists separately from a communications system as described in the present invention, the control device deactivates in response to braking system engagement and reactivates upon braking system disengagement. Preferably, the control device receives input in cycles and makes a determination for operation of the alerting device within each cycle.

In one embodiment, the control device 340 takes input from the accelerometer-gyroscopic sensor 310, the braking system engagement detector 320, and the throttle engagement detector 330 in cycles that are substantially continuous in time. In the preferred embodiment, for each cycle, the control device 340 enters one of four states: I) it does not activate an alerting device for the entirety of the cycle, II) it activates an alerting device for the entirety of the cycle, III) it activates an alerting device at least once for a period of time that is short relative to the duration of the cycle; or IV) it activates an alerting device multiple times during the cycle.

Figure 3B:
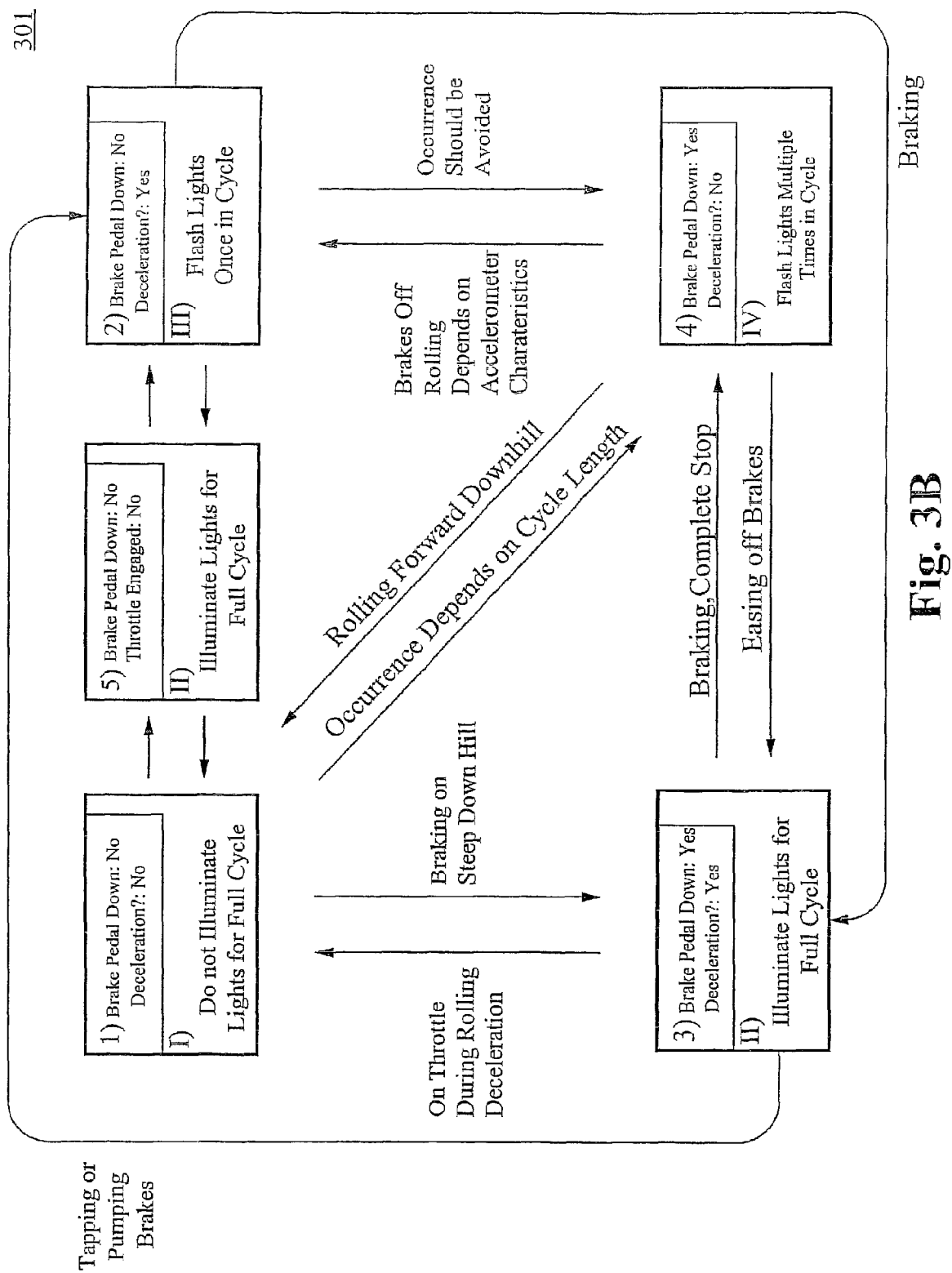
FIG. 3B illustrates a state machine diagram of the control device in accordance with the preferred embodiment of the present invention.

FIG. 3B illustrates a preferred embodiment in which these four output states are handled. A state machine 301, included in a control device in accordance with the present invention, takes five possible input states, for four of them throttle status is not considered: 1) brake pedal is not depressed, absolute deceleration is not detected; 2) brake pedal is not depressed, absolute deceleration is detected; 3) brake pedal is depressed, absolute deceleration is detected; or 4) brake pedal is depressed, absolute deceleration is not detected. State 5) only occurs if the throttle is disengaged, and if the brake pedal is not depressed. Input state 1 corresponds to output state I, input state 2 corresponds to output state III, input states 3 and 5 correspond to output state II, and input state 4 corresponds to output state IV.

Transitions between all input states are handled and every transition is a plausible outcome of a braking or acceleration event. For example, a driver disengaging the throttle pedal causes a transition from state 1 to state 5. In the first cycle detecting state 5, the brake lamps are illuminated. Once a required level of absolute deceleration is detected, a transition from state 5 to state 2 occurs. In the first cycle detecting state 2, the brake lamps are flashed, or another alerting device is activated, corresponding to output state III. A transition from state 1 directly to state 2 can occur when beginning ascent of a steep grade: the throttle is engaged, the brake pedal is disengaged but the vehicle begins to decelerate.

If the driver engages the throttle again, or in the case of an ascent, increases the throttle, a transition from state 5 to state 1, or state 2 to state 1, occurs. If the driver subsequently depresses the brake pedal, a transition from state 2, or state 5, to state 3 occurs. While the brake pedal is depressed, state II output keeps the brake lamps illuminated. Furthermore, while the brake pedal is depressed, a transition from state 3 to state 4 may occur. In this embodiment, in state 4 the lamps are flashed at an increased rate. Whenever the brake pedal is depressed, state II or IV output occurs and accelerometer-gyroscopic sensor data is effectively ignored. When the brake pedal is released, one of input state 1, input state 2, and input state 5 are entered.

A transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

Figure 3C:
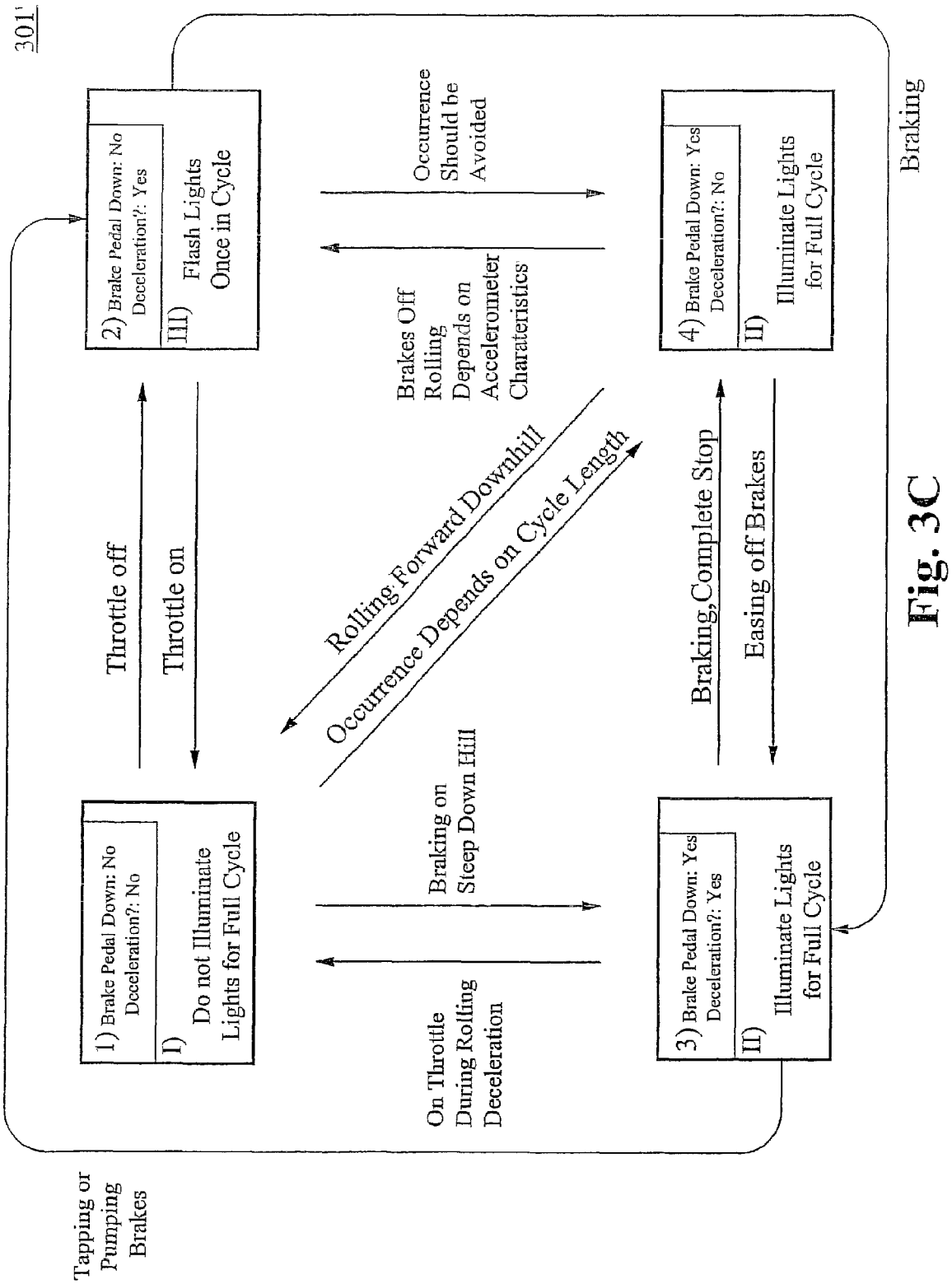
FIG. 3C illustrates a state machine diagram of the control device in accordance with an alternative embodiment of the present invention.

In the alternative embodiment illustrated in FIG. 3C, a state machine 301' included in a control device in accordance with the present invention, the system only considers the first three states. The state machine 301' takes four possible input states: 1) brake pedal is not depressed, absolute deceleration is not detected; 2) brake pedal is not depressed, absolute deceleration is detected; 3) brake pedal is depressed, absolute deceleration is detected; or 4) brake pedal is depressed, absolute deceleration is not detected. Input state 1 corresponds to output state I, input state 2 corresponds to output state III, and input states 3 and 4 correspond to output state II.

Transitions between all input states are handled and every transition is a plausible outcome of a braking or acceleration event. For example, a driver taking his or her foot off the accelerator pedal causes a transition from state 1 to state 2. In the first cycle detecting state 2, the brake lamps are flashed, or other alerting means are activated, corresponding to output state III. This transition from state 1 to state 2 also occurs when beginning ascent of a steep grade: the accelerator is depressed, the brake pedal is disengaged but the vehicle begins to decelerate. If the driver presses the accelerator again, or in the case of an ascent, further depresses the accelerator, a transition from state 2 to state 1 occurs. If the driver subsequently depresses the brake pedal, a transition from state 2 to state 3 occurs. While the brake pedal is depressed, state II output keeps the brake lamps illuminated. Furthermore, while the brake pedal is depressed, a transition from state 3 to state 4 may occur. In this embodiment, such a transition results in no change in output. Whenever the brake pedal is depressed, state II output occurs and accelerometer-gyroscopic sensor data is effectively ignored. When the brake pedal is released, either input state 1 or input state 2 is entered.

Transitions between states in this embodiment are similar to those in the preferred embodiment. A transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

Embodiments of the present invention provide the driver of a subject vehicle a communication system that provides warning signals to other vehicles of any absolute deceleration or possibility of braking of the subject vehicle. One novel and distinguishing feature of this invention is that the subject vehicle's communication system warns other vehicles of any possibility that the subject vehicle will begin to brake. This is so because any engagement of the brake pedal is usually immediately preceded by a disengagement of the throttle.

Thus, this invention provides an earlier warning to the driver of the following vehicle of a subject vehicle's intent to decelerate than is currently available in modern vehicles, which only provide systems that actuate warning lamps if the driver depresses the brake pedal or if an accelerometer unit detects a threshold deceleration. Modern drivers respond quickly to rear brake warning lamps, conditioning that the present invention takes advantage of by using these warning systems to convey new and broader warnings. Since following distances on modern roadways are often inadequate, this arrangement could prevent numerous rear-end collisions.

Example 2

Anti-Rollover Systems

In one embodiment of this invention, outputs from the sensing of absolute lateral acceleration are used to adjust suspension systems by stiffening outside suspension and/or loosening inside suspension of moving vehicles. When lateral acceleration or force is applied to a vehicle, it tends to lean in the direction opposite to the force being applied, due in part to the softness of their suspension systems. This moves the center of gravity further off center and in some cases outside of their wheelbase approaching the critical rollover point. Stiffening the outside suspension and/or loosening the inside suspension keeps the center of gravity of vehicles within a tighter envelope relative to the wheelbase. This inversely affects the propensity, especially in high center of gravity loaded vehicles, to rollover when the center of gravity of their load exceeds the wheelbase and reaches the critical rollover point. Additionally, by adjusting the suspension system in this manner the distribution of load between left and right side wheels is kept more even resulting in improved traction.

Typically these are configured as pulse width modulated (PWM) controlling devices. Such devices typically accept analog voltage level inputs, which are then converted to a corresponding pulse width output. Such outputs are a common method of controlling and delivering a regulated amount of current to a device such as a hydraulic solenoid. The hydraulic solenoids of course are responsible for increasing, decreasing or maintaining pressure levels within the hydraulic or pneumatic suspension system.

Figure 4:
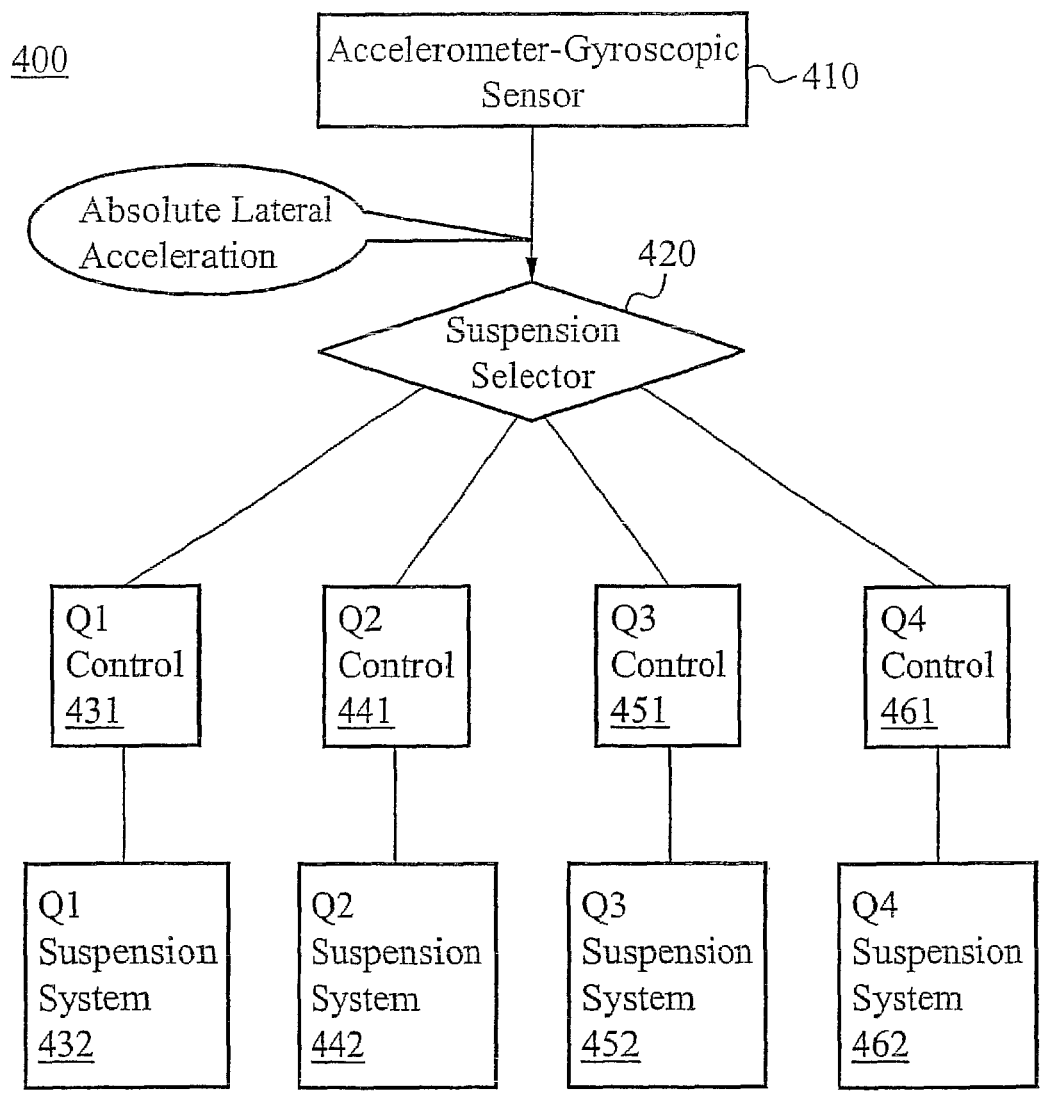
FIG. 4 illustrates a schematic view of an anti-rollover system in accordance with an embodiment of the present invention.

An anti-rollover device 400 is illustrated in FIG. 4. In this embodiment vehicles are assumed to be equipped with adjustable suspension systems, typically hydraulic or pneumatic. When absolute lateral acceleration is sensed the accelerometer-gyroscopic sensor 410 sends a signal representing absolute lateral acceleration to a suspension selector 420, which passes signals along to a controller responsible for controlling the relevant quadrant of the suspension. The suspension selector 420 must interpret the signal to determine the appropriate quadrant. For example, Q1, in which suspension system 432 is controlled by suspension control 431 could be the right front wheel; Q2, in which suspension system 442 is controlled by suspension control 441 could be the left front wheel; Q3, in which suspension system 452 is controlled by suspension control 451 could be the right rear wheel; and Q4, in which suspension system 462 is controlled by suspension control 461 could be the left rear wheel. Of course, other orderings are possible, as are systems with only two independent zones, e.g. two sides are controlled in lockstep.

Example 3

Performance Monitoring Systems

Due to fuel efficiency goals and competitive pressures late model vehicles have the ability to monitor engine system performance through an array of sensors and detectors. The absolute accelerometer/gyroscope combination provides the ability to communicate actual power-to-the-ground data for use in engine/vehicle performance computations. In this embodiment, the accelerometer-gyroscopic sensor continuously sums absolute acceleration values to provide both absolute acceleration and actual speed values, which can be used by a manufacturers vehicle computer unit (VCU).

Figure 5:
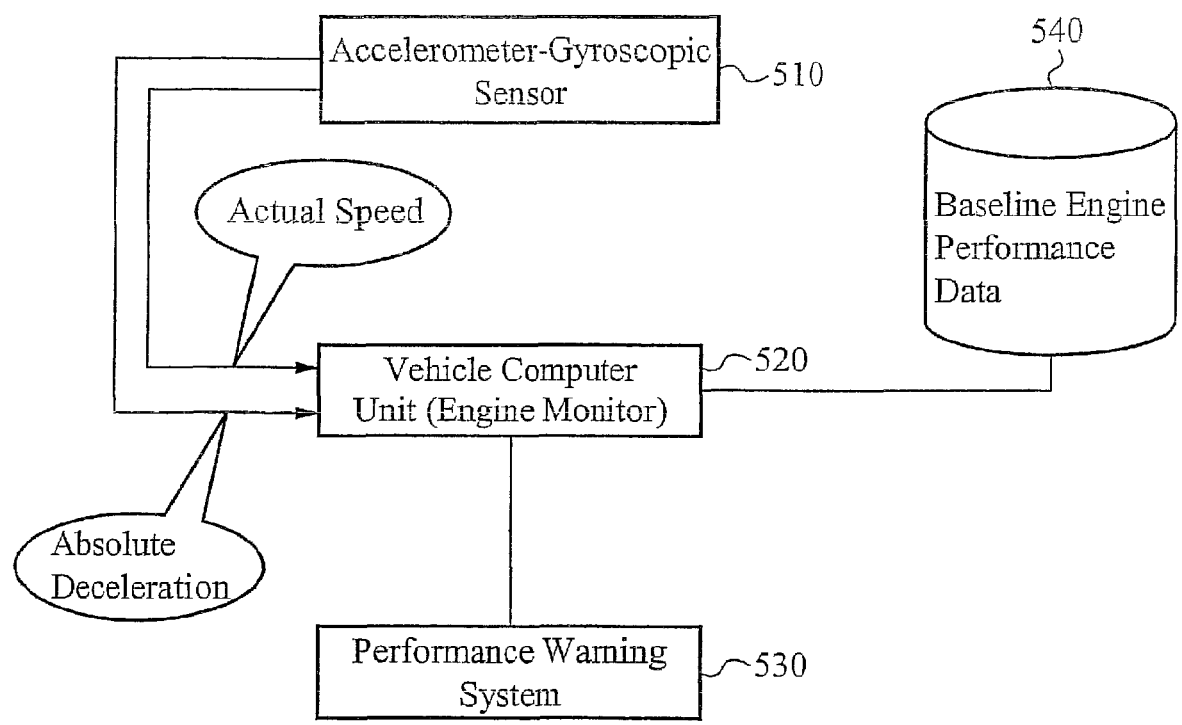
FIG. 5 illustrates a schematic view of an engine performance monitoring system in accordance with an embodiment of the present invention.

For example, the system 500 shown in FIG. 5 includes the accelerometer-gyroscopic sensor 510, which delivers actual speed data and absolute acceleration data to a vehicle computer unit (VCU) 520 (or at least the engine monitoring portion thereof). The VCU 520 uses baseline engine performance data 540 to either self-correct through a feedback mechanism, or to issue a warning through the performance warning system.

The manufacturer's baseline engine performance data is helpful in determining how much acceleration should be achieved for a given amount of throttle and what the speed of the vehicle should be for a given amount of throttle. For instance, a VCU may have tuned to maximum efficiency however the vehicle's corresponding speed or acceleration may be many percentage points less than what would be expected, indicating perhaps that the tire pressure is low or that the vehicle is loaded to a higher level than what would be normal, in which case the tire pressure should be increased.

Example 4

Road or Suspension Condition Monitoring Systems

Because an accelerometer-gyroscopic sensor, which is used and is part of this invention can use one axis of a dual axis accelerometer in the vertical position vertical acceleration output signals are made available to other monitors or computers that require this information. Such a requirement may be to monitor and evaluate road quality and/or shock absorber utilization and performance. For instance, it is apparent to a rider in a vehicle when such vehicle is riding on worn out shock absorbers. However, it becomes less apparent when those shock absorbers wear out slowly over an extended period of time. The first time a driver may realize that shock absorbers have worn out is in cases where critical performance is required. Or when they replace worn out tires and see the evidence on tires of worn out shock absorbers. The absolute A/G sensor detects vertical acceleration in very small increments. Increasing levels of vertical acceleration can easily be monitored thus providing notice to drivers of the degradation of shock absorber system.

Figure 6:
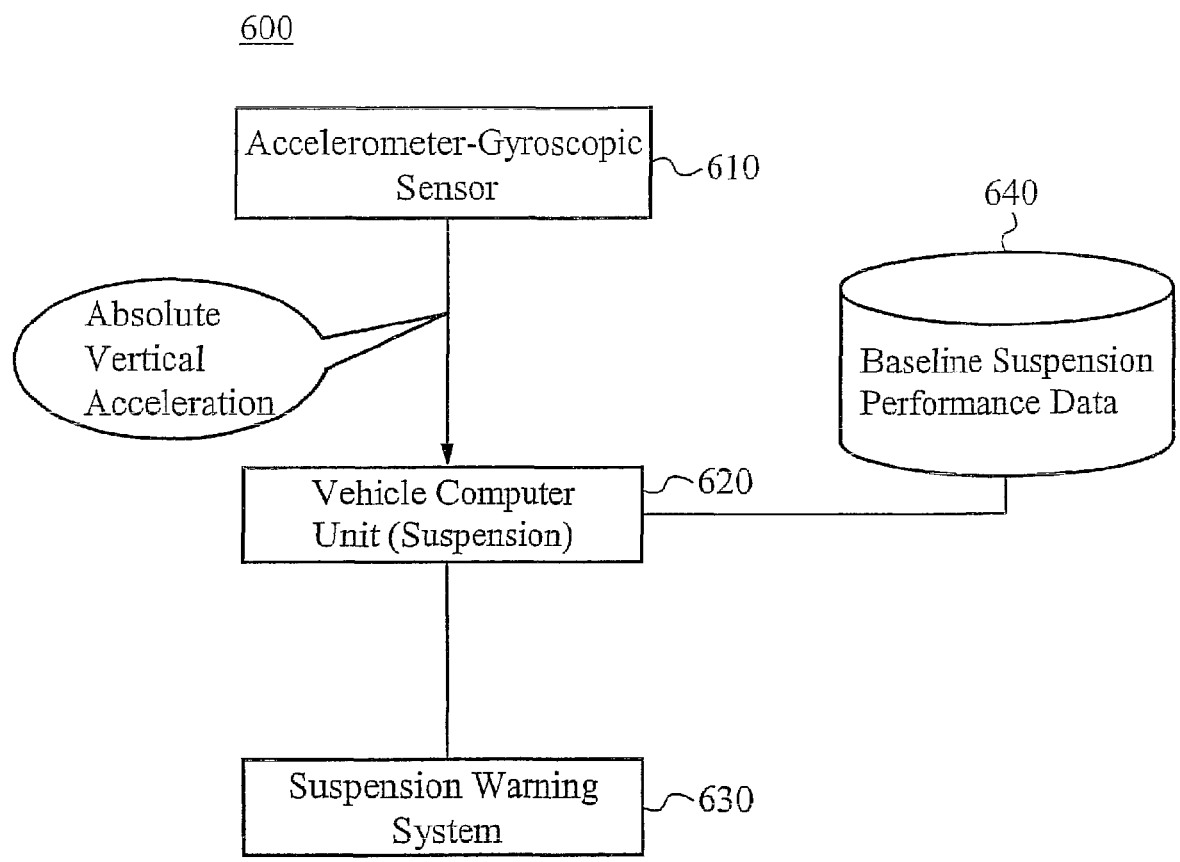
FIG. 6 illustrates a schematic view of a suspension and road condition monitoring system in accordance with an embodiment of the present invention.

For example, in the system 600 shown in FIG. 6, the accelerometer-gyroscopic sensor 610 provides absolute vertical acceleration data to a VCU 620 or at least a suspension-monitoring portion thereof. The VCU 620 can use baseline suspension performance data 640 to either self-correct through a feedback mechanism or issue a warning through the suspension warning system 630.

Example 5

Navigation Systems

In most embodiments, the accelerometer-gyroscopic sensor is continuously monitoring acceleration; a unit of acceleration multiplied by a unit of time yields a unit of velocity (with speed as its magnitude). Preferably, the accelerometer-gyroscopic sensor continuously sums units of acceleration over small increments of time. In this case, the accelerometer-gyroscopic sensor provides the integrated velocity or speed as an output. Preferably, when a horizontally mounted gyroscope is incorporated, the accelerometer-gyroscopic sensor also provides direction or heading as an output.

Figure 7:
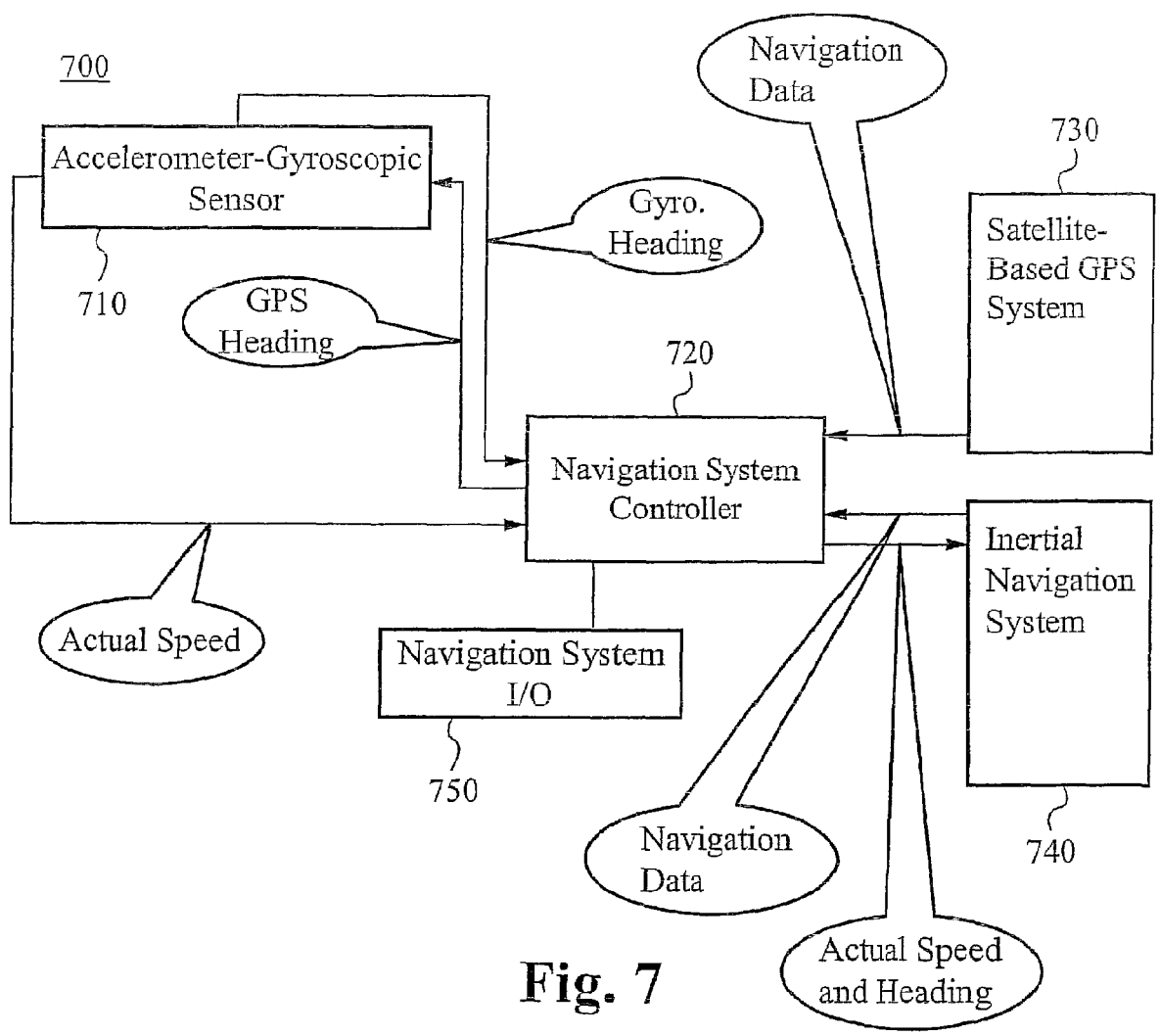
FIG. 7 illustrates a navigation system in accordance with an embodiment of the present invention.

Because velocity, or speed and heading are the raw elements required for inertial navigation systems. In the system 700 shown in FIG. 7, the accelerometer-gyroscopic sensor 710 provides actual speed and heading information as an output to a navigation system controller 720. The navigation system controller 720, which normally provides navigation data from a global positioning system (GPS) 730 directly to the navigation system input/output (I/O) 750, incorporates heading information from the accelerometer-gyroscopic sensor 710 during periods of connection loss with the GPS satellite system. In return for providing the heading data to the inertial navigation system 740, the navigation controller receives navigation data from the inertial system to supplement or replace its GPS data.

Preferably, the navigation system controller 720 also provides GPS heading data back to the accelerometer-gyroscopic sensor 710 to permit re-referencing of the gyroscopes contained therein. Continuous referencing and re-referencing of the horizontally mounted gyroscope utilize GPS heading values while satellite signals are acquired. Once satellite signals are lost gyroscopic heading values take priority using last known valid headings from the GPS. This method using absolute A/G values for supplementing data to the GPS data when the GPS system has lost signal will find use in many applications outside of the automotive industry.

These elements in output signal format are made available to on board GPS based navigation systems through a data port for supplementation during periods of lost or down satellite signals so that the user of a GPS navigation system sees no down time during these periods.

In another aspect, since speed or velocity can be tracked by summing positive and negative accelerations and multiplying by time, a second multiplication by time can yield distance, which is also useful in navigation.

Example 6

Altimeter Systems

In another aspect, summing positive and negative vertical accelerations over time yields altitude. For example, an instrument, including an accelerometer-gyroscopic sensor, placed in an airplane or other flying object, contains a circuit that continuously sums over all accelerations and outputs altitude. Alternatively, a system including an accelerometer-gyroscopic sensor included in a non-flying vehicle tracks changes in altitude and outputs a signal used to vary engine performance or some other type of parameter.

This method of altitude determination has certain advantages over current methods of determining altitude which rely on either radar, pressure sensors, or GPS triangulation. Of course its accuracy in determining altitude above sea level (ASL) relies on knowledge of initial altitude, and its accuracy in determining altitude above ground level (AGL) relies on terrain maps or something similar. Since this type of instrument would reveal nothing about a changing ground level below an aircraft, any aircraft equipped with it would still require a radar altimeter for determining AGL on instrument approaches that require such.

Of course, the present invention has additional uses that are not discussed in the embodiments above. The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent that those skilled in the art that modifications can be made to the embodiments chosen for illustration without departing from the spirit and scope of the invention.

We claim:

1. A communication system for a vehicle, comprising:
   a. an absolute deceleration detector including an accelerometer, a gyroscope, and a control logic and configured to detect an absolute deceleration status of the vehicle;
   b. a braking system engagement detector to detect a braking status of the vehicle;
   c. an alerting device capable of signaling other drivers of a deceleration condition of the vehicle; and
   d. a control device coupled to the absolute deceleration detector, the braking system engagement detector, and the alerting device, wherein the deceleration detector sends signals to the control device and the control device operates the alerting device in a manner dependent on the absolute deceleration status of the vehicle.

2. The communication system of claim 1, wherein the alerting device comprises lamps on the vehicle that are capable of flashing.

3. The communication system of claim 2, wherein the lamps are capable of flashing only at a constant rate.

4. The communication system of claim 2, wherein the lamps are capable of flashing at a variable rate, and further wherein the control device is configured to flash the lamps at a rate correlated to a rate of deceleration.

5. The communication system of claim 2, wherein the lamps are one of the following: conventional signaling lamps and conventional brake lamps.

6. The communication system of claim 5, wherein the control device further comprises a control system for the conventional brake lamp system, whereby the communication system is an integrated control and circuitry system for all brake lamps.

7. The communication system of claim 5, wherein the existing control system for the conventional brake lamp system is substantially unmodified, and wherein the control device communicates with the conventional brake lamp system in a substantially separate manner.

8. The communication system of claim 5, wherein the control device is an addition to a control system for the conventional brake lamp system.

9. The communication system of claim 2, wherein the lamps are in addition to conventional brake lamps and conventional signaling lamps.

10. The communication system of claim 1, wherein the control device receives signals from the deceleration detector, the throttle engagement detector, and the braking system engagement detector in cycles.

11. The communication system of claim 1, further comprising an input device coupled to the control device.

12. The communication system of claim 11, wherein the input device comprises a throttle engagement detector configured to relay a throttle status to the control device.

13. The communication system of claim 11, wherein the input device comprises a clutch engagement detector configured to relay a clutch status to the control device.

14. The communication system of claim 1, wherein once the braking system is engaged, a conventional brake lamp system is activated and the communication system is deactivated.

15. The communication system of claim 14, wherein once the braking system is disengaged, the communication system is re-activated.

16. A communication system for a vehicle, comprising:
   a. an absolute deceleration detector including an accelerometer, a gyroscope, and a control logic and configured to detect an absolute deceleration status of the vehicle;
   b. an alerting device capable of signaling other drivers of a deceleration condition of the vehicle; and
   c. a control device coupled to the absolute deceleration detector and the alerting device, wherein the deceleration detector sends signals to the control device and the control device operates the alerting device in a manner dependent on the absolute deceleration status of the vehicle.

17. The communication system of claim 16, wherein the alerting device comprises lamps on the vehicle that are capable of flashing.

18. The communication system of claim 17, wherein the lamps are capable of flashing only at a constant rate.

19. The communication system of claim 17, wherein the lamps are capable of flashing at a variable rate, and further wherein the control device is configured to flash the lamps at a rate correlated to a rate of deceleration.

20. The communication system of claim 16, further comprising an input device coupled to the control device.

21. The communication system of claim 20, wherein the input device comprises a throttle engagement detector configured to relay a throttle status to the control device.

22. The communication system of claim 16, wherein the input device comprises a clutch engagement detector configured to relay a clutch status to the control device.

23. A communication system for a vehicle, comprising:
   a. an absolute deceleration detector including an accelerometer, a gyroscope, and a control logic and configured to detect an absolute deceleration status of the vehicle;
   b. an alerting device capable of signaling other drivers of a deceleration condition of the vehicle, wherein the alerting device comprises lamps on the vehicle that are capable of flashing;
   c. a control device coupled to the absolute deceleration detector and the alerting device, wherein the deceleration detector sends signals to the control device and the control device operates the alerting device in a manner dependent on the absolute deceleration status of the vehicle; and
   d. an input device coupled to the control device.

24. The communication system of claim 23, wherein the lamps are capable of flashing only at a constant rate.

25. The communication system of claim 23, wherein the lamps are capable of flashing at a variable rate, and further wherein the control device is configured to flash the lamps at a rate correlated to a rate of deceleration.

26. The communication system of claim 23, wherein the input device comprises a throttle engagement detector configured to relay a throttle status to the control device.

27. The communication system of claim 23, wherein the input device comprises a clutch engagement detector configured to relay a clutch status to the control device.

28. A communication system for a vehicle comprising:
   a. an absolute deceleration detector for detecting a deceleration status of the vehicle;
   b. one or more signaling lamps that illuminate to indicate a deceleration status of the vehicle; and
   c. a control device coupled to the absolute deceleration detector and the one or more signaling lamps, wherein the control device receives a signal from the absolute deceleration detector and operates the one or more signaling lamps based upon a deceleration status of the vehicle.

29. The communication system of claim 28 wherein the control device only operates the one or more signaling lamps if the vehicle is decelerating and not stopped.

30. The communication system of claim 28 wherein the communication system is attached to the vehicle.

31. The communication system of claim 30 wherein the communication system attaches to the vehicle in a wired manner.

32. The communication system of claim 28 wherein the communication system is configured as aftermarket equipment.

33. The communication system of claim 28 wherein the one or more signaling lamps are in addition to the vehicles brake lamps.

34. The communication system of claim 28 wherein the control device is configured to flash the lamps at a rate correlated to a rate of deceleration.

35. The communication system of claim 28 wherein the vehicle is a motorcycle.

36. A communication system for a vehicle comprising:
   a. an absolute deceleration detector for detecting a deceleration status of the vehicle;
   b. one or more signaling lamps electrically coupled to the vehicle and that illuminate to indicate a deceleration status of the vehicle; and
   c. a control device coupled to the absolute deceleration detector and the one or more signaling lamps, wherein the control device receives a signal from the absolute deceleration detector and operates the one or more signaling lamps based upon a deceleration status of the vehicle.

37. The communication system of claim 35 wherein the control device only operates the one or more signaling lamps if the vehicle is decelerating and not stopped.

38. The communication system of claim 35 wherein the communication system attaches to the vehicle in a wired manner.

39. The communication system of claim 35 wherein the communication system is configured as aftermarket equipment.

40. The communication system of claim 35 wherein the one or more signaling lamps are in addition to the vehicles brake lamps.

41. The communication system of claim 35 wherein the control device is configured to flash the lamps at a rate correlated to a rate of deceleration.

42. The communication system of claim 28 wherein the vehicle is a motorcycle.

43. A method of indicating a deceleration status of a vehicle:
   a. sensing an acceleration value of the vehicle;
   b. correcting the acceleration value of the vehicle based upon a calculated gravity value to determine an absolute deceleration value of the vehicle; and
   c. activating one or more signaling lamps if the vehicle is decelerating but not stopped.

44. The method of claim 42 wherein the acceleration value is calculated by one or more accelerometers.

45. The method of claim 42 wherein the one or more signaling lamps are flashed at a rate correlated to a rate of deceleration.

46. The method of claim 42 wherein the one or more signaling lamps are in addition to the vehicles brake lamps.

47. The method of claim 42 wherein the vehicle is a motorcycle.

* * * * *